US012672029B2

(12) United States Patent     (10) Patent No.:   US 12,672,029 B2

Keshavarz Hedayati et al.     (45) Date of Patent:    Jun. 30, 2026

(54) DEVICES, METHODS, AND SYSTEMS FOR PREDICTING RADIO ACCESS NETWORK PERFORMANCE

(71) Applicant: Telefonaktiebolaget LM Ericsson (publ), Stockholm (SE)

(72) Inventors: Samara Keshavarz Hedayati, Stockholm (SE); Rerngvit Yanggratoke, Järfälla (SE); Mattias Lidström, Stockholm (SE); Marius Sorin Sirbu, Åkersberga (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 441 days.

(21) Appl. No.: 18/255,486

(22) PCT Filed: Dec. 3, 2020

(86) PCT No.: PCT/SE2020/051163

§ 371 (c)(1),
(2) Date: Jun. 1, 2023

(87) PCT Pub. No.: WO2022/119485

PCT Pub. Date: Jun. 9, 2022

(65) Prior Publication Data

US 2024/0098569 A1     Mar. 21, 2024

(51) Int. Cl.
| | |
|---|---|
| *H04W 28/08* | (2023.01) |
| *H04W 24/06* | (2009.01) |
| *H04W 28/02* | (2009.01) |

(52) U.S. Cl.
CPC ....... *H04W 28/0942* (2020.05); *H04W 24/06* (2013.01); *H04W 28/0226* (2013.01)

(58) Field of Classification Search
CPC ............. H04W 28/0942; H04W 24/06; H04W 28/0226
See application file for complete search history.

(56) References Cited

U.S. PATENT DOCUMENTS

| | | |
|---|---|---|
| 9,900,790 B1 | 2/2018 | Sheen et al. |
| 9,955,488 B2 | 4/2018 | Ouyang et al. |
| | (Continued) | |

FOREIGN PATENT DOCUMENTS

| | | |
|---|---|---|
| CN | 111083710 A | 4/2020 |
| CN | 112004233 A | 11/2020 |
| | (Continued) | |

OTHER PUBLICATIONS

International Search Report and Written Opinion dated Sep. 2, 2021 for International Application No. PCT/SE2020/051163 filed Dec. 3, 2020; consisting of 12 pages.

(Continued)

*Primary Examiner* — Samina F Choudhry

(74) *Attorney, Agent, or Firm* — Weisberg I.P. Law, P.A.

(57) ABSTRACT

Methods, devices, and a system for prediction of Radio Access Network performance. A device for training a prediction model for predicting Radio Access Network performance obtains information associated with at least one network element; determines a tag for the at least one network element, wherein the tag is based on a network environment property of the at least one network element; and determines, based on the tag, a cluster to be associated with the at least one network element. The device determines a performance indicator value for the at least one cluster, creates a training set comprising the performance indicator value of at least one cluster; and trains a prediction model using the training set. The prediction model trained by the device can be used by a device for prediction of Radio Access Network performance.

20 Claims, 7 Drawing Sheets

(56)                    References Cited

U.S. PATENT DOCUMENTS

| 10,708,122 | B1 | 7/2020 | Liu et al. | |
| 2017/0034720 | A1* | 2/2017 | Gopalakrishnan | .... H04W 16/18 |
| 2017/0290024 | A1 | 10/2017 | Ouyang et al. | |
| 2018/0225587 | A1* | 8/2018 | Khidekel | ........... G06Q 30/0201 |
| 2020/0065333 | A1* | 2/2020 | Epasto | ................ G06F 16/9024 |

FOREIGN PATENT DOCUMENTS

| WO | 2020064134 | A1 | 4/2020 |
| WO | 2020121084 | A1 | 6/2020 |

OTHER PUBLICATIONS

3GPP TSG-RAN WG3 Meeting #110-e R3206729; Title: Initial discussions on further enhancement for data collection; Source: Huawei; Agenda item: 18.2; Document Type: pCR; Nov. 2-12, 2020; consisting of 5 pages.

3GPP TSG-RAN WG3 Meeting #110-e R3-206403; Title: Use cases, AI/ML algorithms, and general concepts; Agenda item: 18.2; Source: Intel Corporation; Document for: Discussion and Decision; Date and Location: Nov. 2-13, 2020, Electronic meeting; consisting of 6 pages.

EPO Communication with Supplementary European Search Report dated Dec. 21, 2023 for European Patent Application No. 20964403.8, consisting of 16 pages.

Telecommunication Standardization Sector SG13-TD224/PLEN; Title: Draft new Supplement 55 to ITU-T Y. 3.170-series (former ITU-T Y.ML-IMT2020-Use-Cases): "Machine learning in future networks including IMT-2020: use cases"—for approval; Source: Editors; Location and Date: Geneva, Oct. 14-25, 2019, consisting of 60 pages.

* cited by examiner

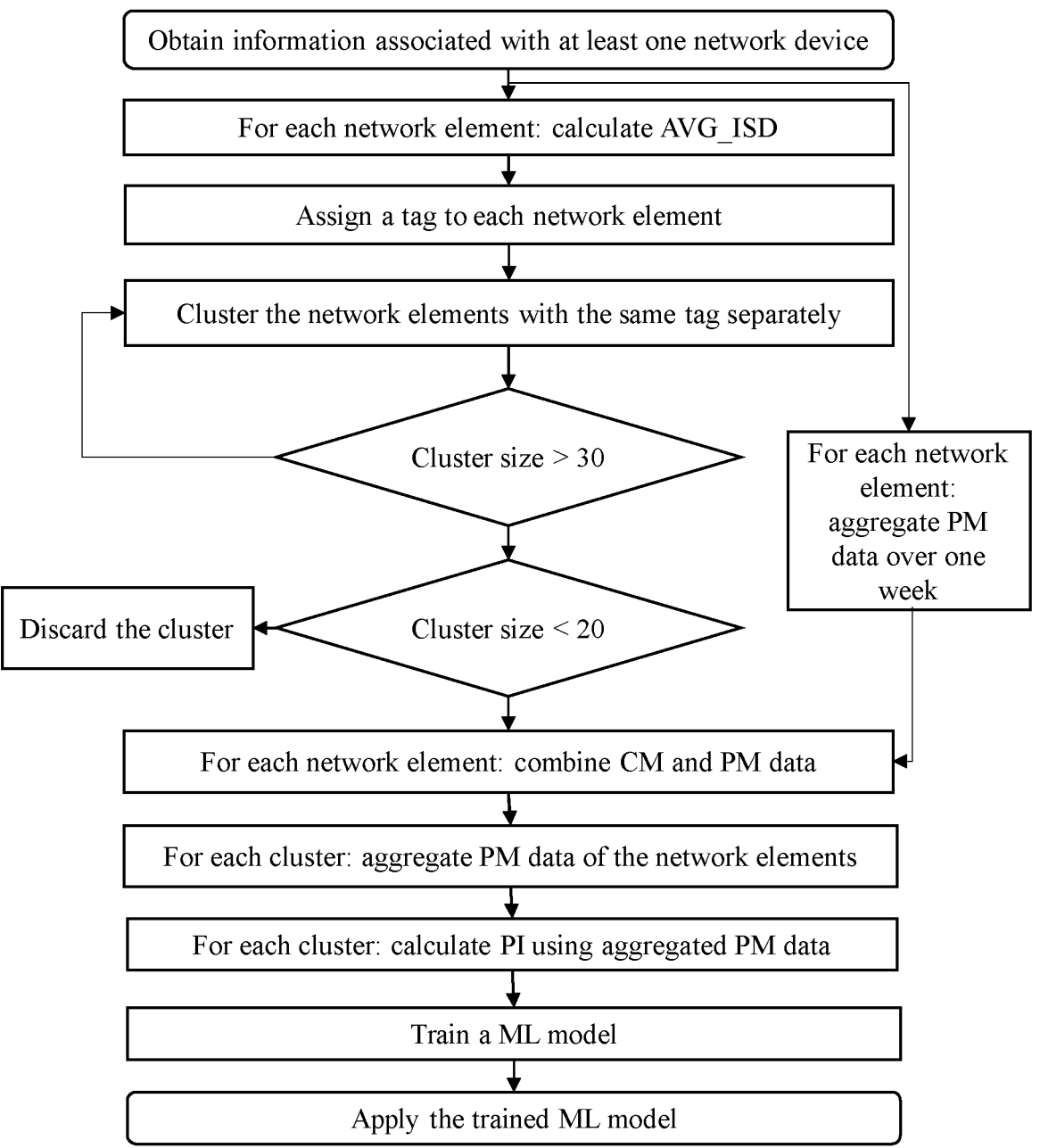

Obtain information associated with at least one network device

For each network element: calculate AVG_ISD

Assign a tag to each network element

Cluster the network elements with the same tag separately

Cluster size > 30

For each network element: aggregate PM data over one week

Discard the cluster

Cluster size < 20

For each network element: combine CM and PM data

For each cluster: aggregate PM data of the network elements

For each cluster: calculate PI using aggregated PM data

Train a ML model

Apply the trained ML model

Figure 5

DEVICES, METHODS, AND SYSTEMS FOR PREDICTING RADIO ACCESS NETWORK PERFORMANCE

CROSS-REFERENCE TO RELATED APPLICATION

This application is a Submission Under 35 U.S.C. § 371 for U.S. National Stage Patent Application of International Application Number: PCT/SE2020/051163, filed Dec. 3, 2020 entitled "DEVICES, METHODS, AND SYSTEMS FOR PREDICTING RADIO ACCESS NETWORK PERFORMANCE," the entirety of which is incorporated herein by reference.

TECHNICAL FIELD

The invention relates to a device for training a prediction model for predicting Radio Access Network performance, a method of training a prediction model, a device for prediction of Radio Access Network performance, a method of prediction of Radio Access Network performance, a system, corresponding computer programs and computer program products.

BACKGROUND

Operators of mobile networks aim to provide the best possible user experience. To this end, they can use performance indicators to know how the system is performing and ensure an effective network planning, performance analysis, and optimization.

Radio Access Network, RAN, performance is often influenced by existing solutions or factors, such as customer network design and amount of traffic in the network. An accurate prediction of the performance of the deployed RAN becomes a crucial task. Solutions proposed in the art predict network performance by using approaches based on clustering of cells with similar physics selected according to engineering experience. Typical selected cell physics parameters include, for example, configuration parameters (Maximum Transmit Power, antenna height or tilt, Maximum number of user equipment, UEs, allowed, High-Speed Downlink Packet Access, HSDPA/High-Speed Uplink Packet Access, HSUPA, allowed, etc.), cell engineering parameters (Inter-Site Distance, Cell Type, etc.), and Interference and coverage characteristics.

US 2017/0034720 A1 discloses methods and systems for predicting network performance by grouping or clustering network elements, NEs, e.g., cells or Base Transceiver Stations, BTSs, based on their performance behavior patterns.

U.S. Pat. No. 9,900,790 B1 discloses a system and method of predicting cellular network performance based on observed performance indicators from cells in a cellular network.

An object of the invention is to enable better performance of future and/or current networks in comparison to the above solutions.

To achieve said object, in a first aspect, a device for training a prediction model for predicting Radio Access Network performance is provided. The device comprises a processor and a memory, the memory having stored thereon instructions executable by the processor. The instructions, when executed by the processor, cause the device to obtain information associated with a plurality of network elements, wherein at least part of the information relates to performance data of the network elements and part of the information relates to configuration data of the network elements; determine a respective tag for the network elements of the plurality of network elements, wherein a tag of a network element is based on a network environment property of the network element; determine, based on the tag, a cluster to be associated with the respective network elements, thus forming at least one cluster which has at least one network element associated thereto; determine a performance indicator value of at least one of the at least one cluster, based on the performance data of the at least one network element associated with the cluster; create a training set comprising the performance indicator value of at least one of the at least one cluster and the configuration data of at least one network element associated with the at least one of the at least one cluster; and train, using the training set, a supervised machine learning model for prediction.

In a second aspect, there is provided a computer-implemented method of training a prediction model performed by a device for predicting Radio Access Network performance. The method comprises obtaining information associated with a plurality of network elements, wherein at least part of the information relates to performance data of the network elements and part of the information relates to configuration data of the network elements; determining a respective tag for the network elements of the plurality of network elements, wherein a tag of a network element is based on a network environment property of the network element; determining, based on the tag, a cluster to be associated with the respective network elements, thus forming at least one cluster which has at least one network element associated thereto; determining a performance indicator value of at least one of the at least one cluster, based on the performance data of the at least one network element associated with the cluster; creating a training set comprising the performance indicator value of at least one of the at least one cluster and the configuration data of at least one network element associated with the at least one of the at least one cluster; and training, using the training set, a supervised machine learning model for prediction.

By the first and second aspect is achieved a more accurate prediction of performance indicators compared to other solutions. Furthermore, maintenance costs, risk of faults, and time for responses can be reduced.

In an embodiment of the first and second aspect, the device is further configured to determine a cluster performance data for the at least one cluster, wherein the cluster performance data is based on the performance data of the at least one network element associated with the cluster; and determine the performance indicator value based on the cluster performance data.

In an embodiment of the first and second aspect, at least a part of the information associated with the at least one network element relates to a location of the network element.

In an embodiment of the first and second aspect, the device is further configured to process the performance data for the at least one network element by aggregating performance data over a time interval.

By the embodiment of the first and second aspect is possible to perform any modeling for performance indicators predictions.

In an embodiment of the first and second aspect, the device is further configured to combine the performance data for the at least one network element with the configuration data of the at least one network element.

In an embodiment of the first and second aspect, the training set further comprises the cluster performance data.

In an embodiment of the first and second aspect, the device is further configured to determine the tag based on a value representing the distance between the at least one network element and one or more neighbors of the at least one network element.

In an embodiment of the first and second aspect, the device is further configured to determine the cluster based on geographical proximity between the network element and a further network element with a same tag.

By the embodiment of the first and second aspect is achieved a higher accuracy compared to other solutions, because of the use of a clustering based on geographical proximity of network elements.

In an embodiment of the first and second aspect, the device is further configured to associate a number of at least one further network element with the cluster, the number falling within a range of 10 to 50.

In an embodiment of the first and second aspect, the number falls within the range of 20 to 30.

By the embodiment of the first and second aspect is achieved stable network performance, i.e., the cluster is not too small to highlight noises and fluctuations, not too big to wash away all the deviations in the overall performance of the network.

In an embodiment of the first and second aspect, the device is further configured to redetermine a cluster for the at least one network element of a cluster if the number of at least one network element of the cluster is higher than an upper bound value.

In an embodiment of the first and second aspect, the device is further configured to train the supervised machine learning model further using the cluster performance data of the at least one cluster.

In an embodiment of the first and second aspect, the device is further configured to discard the cluster if the number of at least one further network element of the cluster is lower than a lower bound value.

In an embodiment of the first and second aspect, the device is further configured to determine the cluster performance data by aggregating the performance data aggregated over a time interval of a first network element with further performance data aggregated over a time interval of at least one further network element, wherein the at least one further network element is associated with the cluster.

In an embodiment of the first and second aspect, the device is further configured to apply the prediction model to information associated with at least one unseen cluster of network elements, wherein part of the information relates to performance data of the network elements associated with the unseen cluster, part of the information relates to configuration data of the network elements associated with the cluster, and part of the information relates to a tag representing a network environment property of the network elements associated with the cluster; and select an output of the prediction model as a performance indicator value for a prediction of Radio Access Network performance of the at least one unseen cluster of network elements.

In an embodiment of the first and second aspect, the device is further configured to obtain the information associated with at least one network element from the at least one network element.

In a third aspect, there is provided a device for prediction of Radio Access Network performance, the device comprising a processor and a memory, the memory having stored thereon instructions executable by the processor. The instructions, when executed by the processor, cause the device to obtain information associated with at least one cluster of network elements, wherein part of the information relating to a cluster of network elements relates to performance data of the network elements associated with the cluster, part of the information relates to configuration data of the network elements associated with the cluster, and part of the information relates to a tag representing a network environment property of the network elements associated with the cluster; apply, to the obtained information, a prediction model for prediction of Radio Access Network Performance; and select an output of the prediction model as a performance indicator value for a prediction of Radio Access Network performance of the at least one cluster of network elements.

In a fourth aspect, there is provided a method of prediction of Radio Access Network performance performed by a device of prediction. The method comprises obtaining information associated with at least one cluster of network elements, wherein part of the information relates to performance data, part of the information relates to configuration data, and part of the information relates to a tag representing a network environment property of the network elements; applying, to the obtained information, a prediction model for prediction of Radio Access Network Performance; and selecting an output of the prediction model as a performance indicator value for a prediction of Radio Access Network performance of the at least one cluster of network elements.

In an embodiment of the third and fourth aspect, the device is further configured to receive a prediction model from a device for training a prediction model, wherein the prediction model has been prepared by the device for training a prediction model by using a training set comprising a performance indicator value based on training cluster performance data and training configuration data of at least one training network element associated with a training cluster.

In a fifth aspect, there is provided a system for predicting Radio Access Network performance comprising a device for training a prediction model for predicting Radio Access Network performance and a device for prediction of Radio Access Network performance. The system of this fifth aspect comprises the device for training a prediction model configured to obtain information associated with a plurality of network elements, wherein at least part of the information relates to performance data of the network elements and part of the information relates to configuration data of the network elements; to determine a respective tag for the network elements of the plurality of network elements, wherein a tag of a network element is based on a network environment property of the at least one network element; to determine, based on the tag, a cluster to be associated with the respective network elements, thus forming at least one cluster which has at least one network element associated thereto; to determine a performance indicator value of the at least one of the at least one cluster, based on the performance data of the at least one network element associated with the cluster; to create a training set comprising the performance indicator value of the at least one the at least one cluster and the configuration data of at least one network element associated with the at least one of the at least one cluster; and to train, using the training set, a supervised machine learning model for prediction; to send the supervised machine learning model to the device for prediction of Radio Access Network performance. The system of this fifth aspect further the device for prediction of Radio Access Network performance configured to obtain information associated with at least one cluster of network elements, wherein part of the information relating to a cluster of network elements relates to performance data of the network elements associated with the cluster, part of the information relates to configuration data of the network elements associated with the cluster, and part of the information relates to a tag representing a network environment property of the network elements associated with the cluster; to receive the supervised machine learning model; to apply, to the obtained information, the supervised machine learning model for prediction of Radio Access Network Performance; and to select an output of the prediction model as a performance indicator value for a prediction of Radio Access Network performance of the at least one cluster of network elements.

In yet a further aspect, there is provided a computer program comprising instructions, which, when run in a processing unit on a device, cause the device to obtain information associated with a plurality of network elements, wherein at least part of the information relates to performance data of the network elements and part of the information relates to configuration data of the network elements; determine a respective tag for the network elements of the plurality of network elements, wherein a tag of a network element is based on a network environment property of the network element; determine, based on the tag, a cluster to be associated with the respective network elements, thus forming at least one cluster which has at least one network element associated thereto; determine a performance indicator value of at least one of the at least one cluster, based on the performance data of the at least one network element associated with the cluster; create a training set comprising the performance indicator value of at least one of the at least one cluster and the configuration data of at least one network element associated with the at least one of the at least one cluster; and train, using the training set, a supervised machine learning model for prediction.

In yet a further aspect, there is provided a computer program product comprising a computer readable storage medium on which a computer program, as summarized above, is stored.

In yet a further aspect, there is provided a computer program comprising instructions which, when run in a processing unit on a device, cause the device to obtain information associated with at least one cluster of network elements, wherein part of the information relating to a cluster of network elements relates to performance data of the network elements associated with the cluster, part of the information relates to configuration data of the network elements associated with the cluster, and part of the information relates to a tag representing a network environment property of the network elements associated with the cluster; apply, to the obtained information, a prediction model for prediction of Radio Access Network Performance; and select an output of the prediction model as a performance indicator value for a prediction of Radio Access Network performance of the at least one cluster of network elements.

In yet a further aspect, there is provided a computer program product comprising a computer readable storage medium on which a computer program, as summarized above, is stored.

BRIEF DESCRIPTION OF THE DRAWINGS

For an even better understanding of the present disclosure, and to show more readily how it may be carried into effect, reference will now be made, by way of example, to the following drawings, in which:

FIG. 5 is a flow chart illustrating exemplary steps for performing a method according to embodiments;

DETAILED DESCRIPTION

Embodiments will be illustrated herein with reference to the accompanying drawings. These embodiments are provided by way of example so that this disclosure will be thorough and complete, and will fully convey the scope of the inventive concept to those skilled in the art.

By using information on a network environment property of network elements in a Radio Access Network and network element geographical information, a device forms a cluster of network elements and creates a data set to give as input to a prediction model to predict network performance of the Radio Access Network. This will be further described in relation to FIGS. 1A and 1B. A network environment property of a network element could for example be the network element density that can be calculated by using average inter-site distance, ISD, between the network element and a number of the network element's neighbors. Network elements with a same network environment property and geographically close will be assigned to the same cluster. The use of a training set based on clusters of network elements, wherein the network elements are characterized by geographical proximity, makes the prediction of performance indicators more accurate compared to other solutions. Hereby, maintenance costs, risk of faults, and time for responses can be reduced.

Figure 1A:
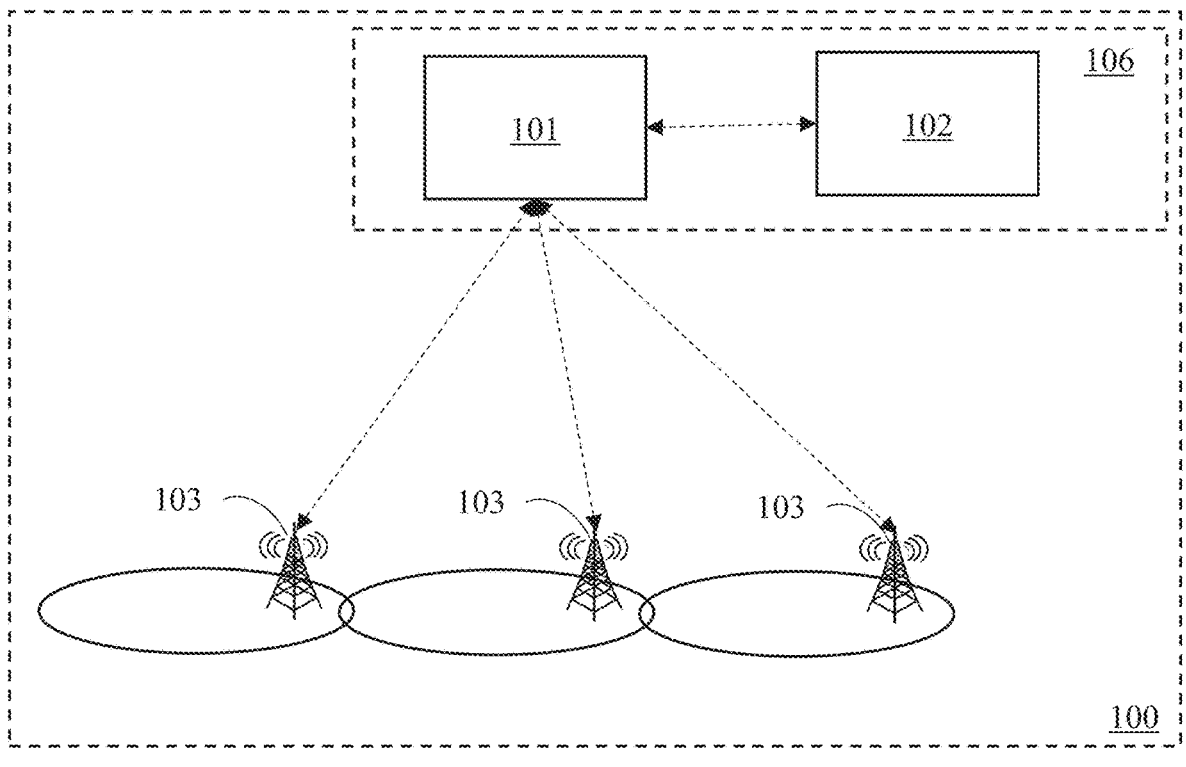
FIG. 1A is a schematic overview depicting an example of a system using devices according to embodiments.

FIG. 1A schematically shows an example of a telecommunications system 100 in which the present invention may be practiced. The illustrative telecommunications system comprises a device 101 for training a prediction model for predicting Radio Access Network performance, a device 102 for prediction of Radio Access Network performance, and a plurality of network elements 103. In FIG. 1A, the device 101 and the device 102 form a system 106 for predicting Radio Access Network performance. The devices 101, 102 can be comprised in a router, gateway, and any device with computing, storage, and network connectivity to the communication network 100 when active. The devices 101, 102 can be hosted on the same physical devices. In another embodiment, the devices 101 and 102 can be stand-alone physical devices. Furthermore, functionality performed by devices 101, 102 may be performed in a plurality of physically separated nodes arranged in a cloud environment or by a centralized entity.

In the embodiment illustrated in FIG. 1A, the devices 101, 102 can communicate with each other, as well with one or more network elements 103 through a subscription protocol, such as message queuing telemetry transport, MQTT, protocol, or utilizing any one of a number of transfer protocols (e.g., frame relay, internet protocol, IP, transmission control protocol, TCP, user datagram protocol, UDP, hypertext transfer protocol, HTTP, HTTP/2) or Remote Procedure Call, RPC, protocols, such as gRPC, and ensuring security requirements by using TLS. In case of HTTP protocol, the device 101 can send a trained prediction model to the device 102 in a HTTP "POST" message. In case of gRPC, the device 102 can run a gRPC stub and send a Proto Request message to request the trained prediction model to the device 101, and the device 101 can run a gRPC server and send a Proto Response message with the trained model to the device 102.

Figure 1B:
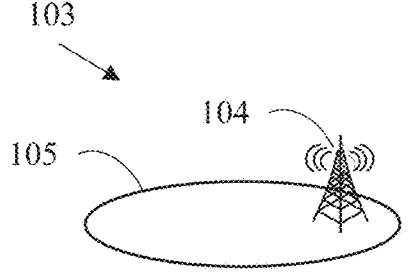
FIG. 1B shows an exemplary network element according to embodiments.

FIG. 1B shows an example of a network element 103. A network element 103 can be a cell (or sector) 105 or a node 104. A node 104 can be a base station according to any wireless generation technology, such as 3G, 4G, 5G, and 6G, wherein a node 104, such as eNodeB and gNodeB, can serve several cells. A node can also be a transport or core node of the wireless generation technology.

Figure 2:
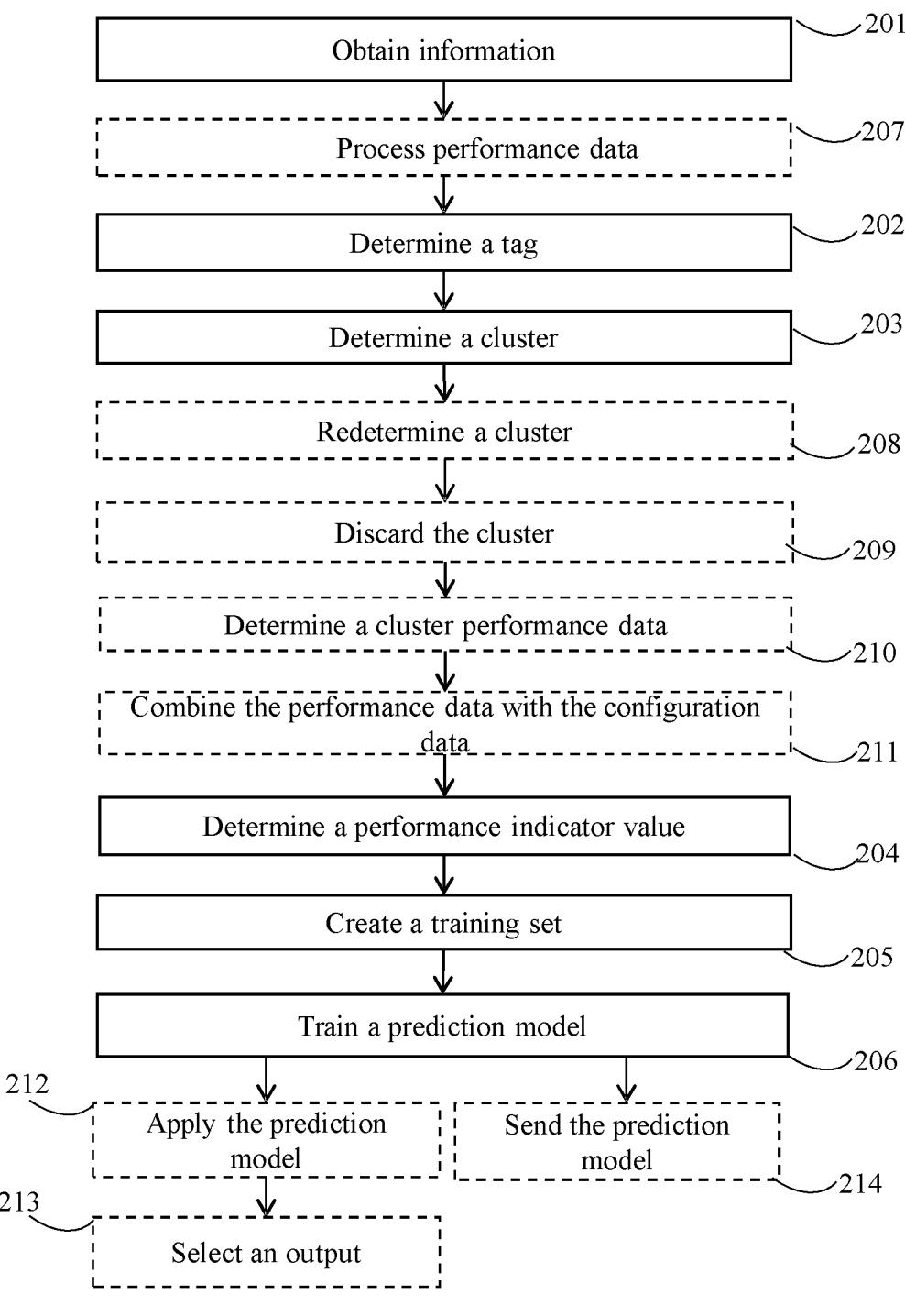
FIG. 2 shows a flowchart illustrating a method performed by a device according to embodiments.

FIG. 2 shows a method for training a prediction model for predicting Radio Access Network performance. The method can be carried out by a device 101 for training a prediction model for predicting Radio Access Network performance.

Referring to the method in FIG. 2, the device 101 obtains information associated with a plurality of network element 103, wherein at least part of the information relates to performance data and part of the information relates to configuration data, step 201. According to an embodiment, the information associated with the plurality of network elements 103 obtained by the device 101 can further comprise a network element location, e.g. geographical coordinates of the network element 103.

The information associated with the plurality of network elements 103 can be obtained from the at least one network element or by an intermediate device that collected and sent the information to the device 101. Performance data comprises information relating to the performance of the network element 103, for example relating to network traffic in a cell 105, such as throughput of the network, number of active users in the network, coverage and interference level of a cell. Configuration data comprises information relating to the configuration of the network element 103, for example relating to a cell 105 and/or a node 104, such as frequency band, uplink/downlink channel bandwidth, and number of receiver/transmitter antennas.

Performance data and configuration data can have different data format depending to the operator. The device 101 parses the performance data and the configuration data. The data structure used by the device 101 for management and storage of the performance data and configuration data can for example be a table-like format, e.g., Pandas DataFrame, comma separated values, CSV, Apache Parquet, Extensible Markup Language, XML, Structured Query Language, SQL. Performance data and configuration data can for example be Performance Management and Configuration Management as defined in 3GPP TS 32.401 v16.0.0, 3GPP TS 32.404 v16.0.0, or 3GPP TS 32.425 v16.5.0.

The device 101 can optionally process the performance data for the at least one network element by aggregating performance data over a time interval, step 207. Performance data and configuration data collection is often performed at different collecting intervals. Configuration data refers to a snapshot of a certain point in time, e.g., at 2 pm on a particular day, and performance data refers to a certain interval, e.g. a quarter-hour for each cell. Thus, to be able to perform any modeling for performance indicators predictions, the device 101 typically needs to transform performance data and configuration data to the same timeframe for the respective network elements, i.e., cell 105 and/or node 104. Thus, the device 101 aggregates the performance data over the desired time interval, wherein the aggregation is a sum of the performance data relating to the cell 105. For example, if the performance data is recorded every 15 minutes for each cell, and the desired timeframe is one week, the device 101 might aggregate the performance data over one week for each cell separately. About the configuration data, the device 101 uses configuration data that does not change during the desired timeframe, e.g. one week.

In the next step, the device 101 determines 202 a tag for the at least one network element, wherein the tag is based on a network environment property of the at least one network element. A network environment property is for example the network element density. The device 101 calculates an average ISD of the at least one network element and a number of the at least one network element's neighbors, by using the obtained geographical coordinates of the at least one network elements and its neighbors. The number of neighbors of a network element 103 can be fixed to a desired number, or can be determined based on an average of several runs with different values. The average ISD can be used to determine a level of development of an area in which the network element is located. Possible values of the level of development could for example be, but are not limited to, dens-urban, urban, sub-urban, and rural. For example, in one of the embodiments, if the distance between two network elements is less than 500 m, the two network elements tag could be dens-urban; if the distance between two network elements is within a range of 500 m to 1 km, the two network elements tag will be urban, if the distance between two network elements is within a range of 1 km to 2 km, the two network elements tag will be sub-urban; and if the distance between two network elements is larger than 2 km, the two network elements tag will be rural. Other definitions of the range can be used to determine the tag of a network element.

In the next step, the device 101 determines 203, based on the tag, a cluster to be associated with the at least one network element. In other words, the network elements with the same tag and which are geographically close, are associated with a same cluster. Two network elements with the same tag are considered geographically close based on a distance evaluated by using the two network elements' coordinates. The distance between two network elements can be calculated for example by using the haversine formula or Euclidean formula. The device 101 is configured to apply a clustering machine learning, ML, algorithm such as, K-means, density-based spatial clustering of applications with noise, DBSCAN, or hierarchical clustering to perform the clustering of the network elements with the same tag.

According to one embodiment, the device associates at least one further network element with the cluster and the cluster will be characterized by a certain size. Network elements in the same cluster typically show differing features, e.g., in terms of frequency bands, uplink/downlink channel bandwidth, number of antennas.

According to an embodiment, the device 101 can constraint the size of the cluster within a certain range characterized by an upper and a lower bound value. In this embodiment, the number of network elements associated with the cluster is within 10 to 50, or within the range of 20 to 30. A cluster of 20-30 network elements presents stable network performance, i.e., the cluster is not too small to highlight noises and fluctuations, not too big to wash away all the deviations in the overall performance of the network.

In the next optional steps 208-209, if the size of the cluster is higher than the upper bound value of the range of the cluster, the device 101 redetermines 208 the cluster by applying the same clustering algorithm or different clustering algorithms. The device 101 performs for example a nested clustering by reapplying the clustering algorithm, or hierarchical clustering (agglomerative or divisive) and extracts the clusters for each level based on cut-off values. If the size of the cluster is a value lower than the lower bound value of the range of the cluster, the device 101 discards 209 the cluster. Experiments showed that most of the data is still preserved (i.e., 80+% of clusters are still usable in the case of a number of network elements in the cluster within the range of 20 to 30).

In step 204, the device 101 determines a performance indicator value for the at least one cluster, based on the performance data of the at least one network element associated with the cluster. The performance indicator value can be a Key Performance Indicator, KPI, such as session setup success rate, call drop rate, handover success rate, as defined in 3GPP TS 32.451 v16.0.0, or a Key Quality Indicator, KQI, such as session drops, or any other performance indicator of the network.

In one embodiment, the device 101 optionally determines 210 cluster performance data for the at least one cluster, wherein the cluster performance data is based on the performance data of the at least one network element associated with the cluster. The cluster performance data is obtained by aggregating the performance data aggregated over a certain timeframe for each network element in step 207, with the performance data aggregated over the same timeframe for the other network elements assigned to the same cluster. The aggregated performance data is combined (e.g. through a join or merge operation in Pandas, a join operation in SQL, a join operation in XML) with the configuration data at the cell level in a single data table, step 211. The combined performance data and configuration data can be used to determine the performance indicator value.

In step 205, the device 101 creates 205 a training set comprising the performance indicator value of at least one cluster and the configuration data of at least one network element in the at least one cluster; and trains a supervised machine learning model using the training set, step 206. According to an embodiment, the training set can further comprise the cluster performance data of the at least one cluster. The device 101 can then optionally perform steps 212-213 or 214.

In step 212, optionally, the device 101 applies the trained supervised machine learning model, to information associated with at least one unseen cluster of network elements. The information relates to performance data of the network elements associated with the unseen cluster, configuration data of the network elements associated with the unseen cluster, and the tag representing a network environment property of the network elements associated with the unseen cluster. The device 101 then selects an output of the prediction model as a performance indicator value for a prediction of Radio Access Network performance of the at least one unseen cluster of network elements, step 213. Typically, the configuration data and performance data of the at least one unseen cluster of network elements have been engineered as input features for the ML model, wherein engineered means that configuration data and performance data have been processed according to one or more of steps 207, 202, 203, 208-211. The tag representing a network environment property of the network elements associated with the unseen cluster is already known prior to step 212.

Alternatively, the device 101 can send the prediction model to a device 102 for prediction of Radio Access Network performance in step 214.

The training set comprises features, e.g., in terms of frequency bands, uplink/downlink channel bandwidth, number of antennas, and corresponding labels, i.e., a performance indicator value evaluated based on the performance data of at least one cluster Performance data of the at least one cluster and configuration data of at least one network element can be engineered, i.e., manipulated to be suitable as input for the ML model according to steps 201-211. Performance data comprises information relating to the performance of the network element 103, for example relating to network traffic in a cell 105, such as throughput of the network, number of active users in the network, coverage and interference level of a cell. Configuration data comprises information relating to the configuration of the network element 103, for example relating to a cell 105 and/or a node 104, such as frequency band, uplink/downlink channel bandwidth, and number of receiver/transmitter antennas. Examples of supervised ML models comprise k-nearest neighbors, KNN, and Random Forest. The supervised ML model can further be used to extract the most important features out of the initial features used, that have the highest impact on the performance indicator values. The extracted important features and the corresponding performance indicator values can be used to train the model again.

If desired the method could be further improved by use of a validation data set as known in the art.

Figure 3:
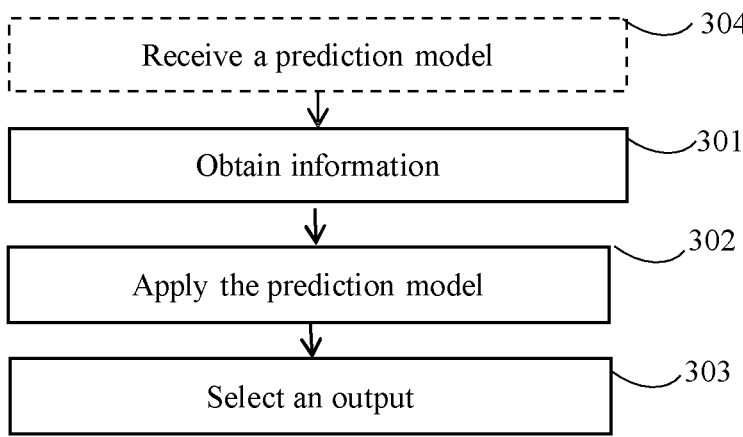
FIG. 3 shows a flowchart illustrating a method performed by a device according to embodiments.

FIG. 3 shows a method for prediction of Radio Access Network performance. The method is carried out by a device 102 for prediction of Radio Access Network performance.

Referring to the method in FIG. 3, the device 102 obtains 301 information associated with at least one cluster of network elements, wherein part of the information relates to performance data, part of the information relates to configuration data, and part of the information relates to a tag representing a network environment property of the network elements. Performance data and configuration data had been processed to be used as input features for a prediction model for prediction of Radio Access Network Performance according to steps 201-211. The information associated with at least one cluster of network elements 103 can be obtained from at least one network element associated with the cluster or by an intermediate device that collected and sent the information to the device 102.

In the next step 302, the device 102 applies, to the obtained information, a prediction model for prediction of Radio Access Network Performance in accordance with the prediction model described in relation to FIG. 2. Then, the device 102 selects an output of the prediction model as a performance indicator value for a prediction of Radio Access Network performance of the at least one cluster of network elements, step 303.

The device 102 optionally receives the prediction model from a device 101 for training a prediction model for prediction of Radio Access Network Performance, step 304, or, the device 102 generates, prior to step 301, a prediction model by performing the method described in relation to FIG. 2. In this scenario, device 101 and device 102 can be seen as the same device. The device 101 or the device 102 trained, or trained and validated, the prediction model by using a training set. The training set comprises a performance indicator determined by using at least one training cluster performance and training configuration data of at least one training network element associated with the training cluster. The term "training" is used to refer to a network element, cluster, performance data and configuration data, cluster performance that was used during the training of the prediction model.

According to an embodiment, there is provided a system 106 for predicting Radio Access Network performance comprising a device 101 for training a prediction model for predicting Radio Access Network performance and a device 102 for prediction of Radio Access Network performance. In the system 106, the device 101 for training a prediction model is configured to obtain 201 information associated with a plurality of network elements 103, wherein at least part of the information relates to performance data of the network elements 103 and part of the information relates to configuration data of the network elements 103; to determine 202 a respective tag for the network elements 103 of the plurality of network elements 103, wherein a tag of a network element 103 is based on a network environment property of the at least one network element 103; to determine 203, based on the tag, a cluster to be associated with the respective network elements 103, thus forming at least one cluster which has at least one network element 103 associated thereto; to determine 204 a performance indicator value of the at least one of the at least one cluster, based on the performance data of the at least one network element 103 associated with the cluster; to create 205 a training set comprising the performance indicator value of the at least one the at least one cluster and the configuration data of at least one network element 103 associated with the at least one of the at least one cluster; to train 206, using the training set, a supervised machine learning model for prediction; and to send 214 the supervised machine learning model to the device 102 for prediction of Radio Access Network performance. The device 102 for prediction of Radio Access Network performance is configured to obtain 301 information associated with at least one cluster of network elements 103, wherein part of the information relating to a cluster of network elements 103 relates to performance data of the network elements 103 associated with the cluster, part of the information relates to configuration data of the network elements associated with the cluster, and part of the information relates to a tag representing a network environment property of the network elements 103 associated with the cluster; to receive 304 the supervised machine learning model; to apply 302, to the obtained information, the supervised machine learning model for prediction of Radio Access Network Performance; and to select 303 an output of the prediction model as a performance indicator value for a prediction of Radio Access Network performance of the at least one cluster of network elements.

Figure 4:
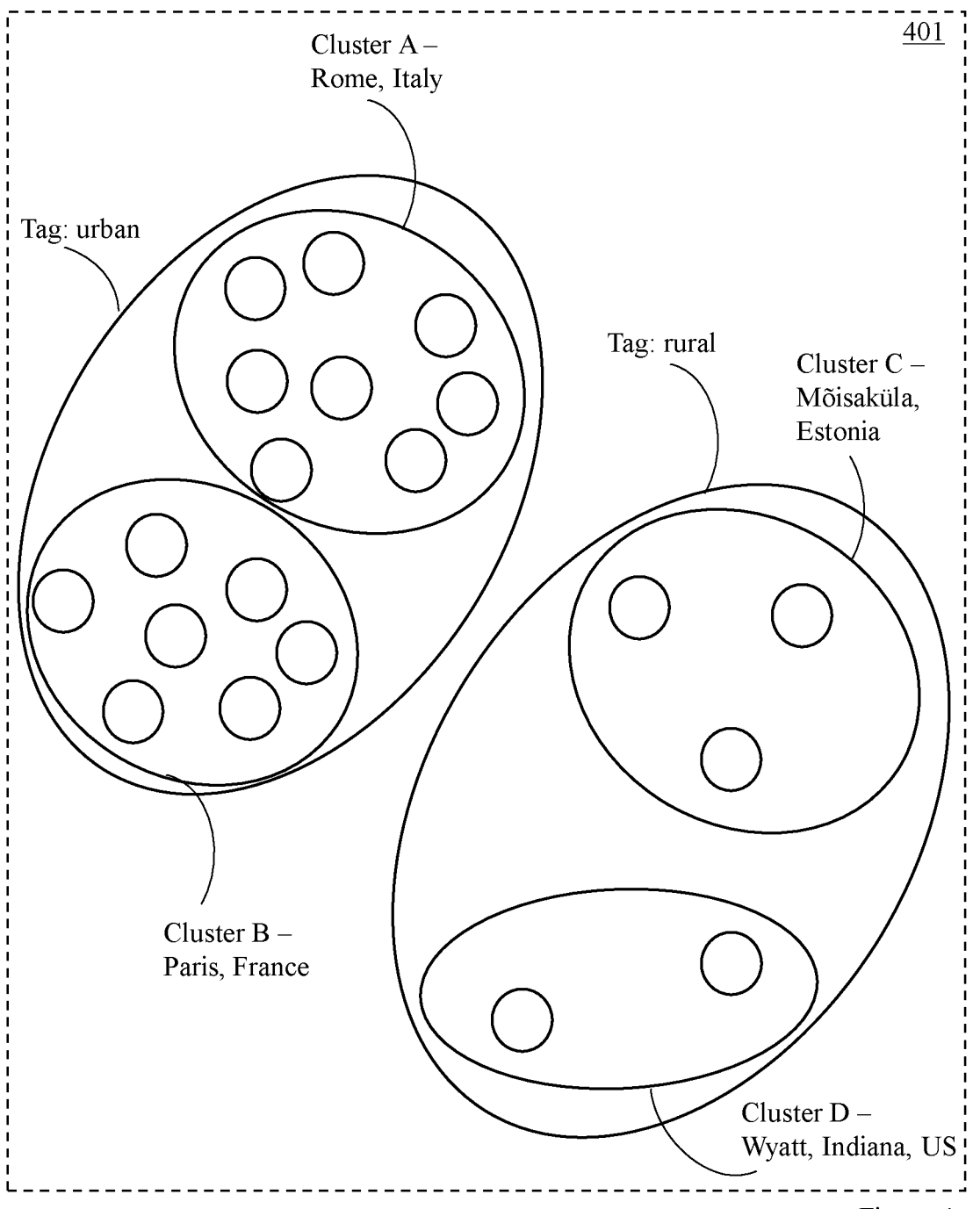
FIG. 4 shows an example of tagging and clustering according to embodiments.

FIG. 4 shows a non-limiting illustration of tagging and clustering, In FIG. 4, nodes represent network devices 103 of RAN in 4 cities: Rome—Italy, Paris—France, Mõisaküla—Estonia, and Wyat—Indiana, US. The network devices 103 in FIG. 4 are first assigned to one of two tags, i.e. urban or rural. Rome and Paris have tag urban and Mõisaküla and Wyatt have tag rural. Network devices 103 with the same tag are then assigned to a cluster. In the example, network devices in Rome are assigned to Cluster A, network devices in Paris are assigned to cluster B, network devices in Mõisaküla are assigned to cluster C, and network devices in Wyatt are assigned to cluster D.

FIG. 5 is a flow chart illustrating an example of steps for performing a method for training a prediction model for predicting Radio Access Network performance, carried out by a device 101 according to one embodiment. In the example, the performance data and configuration data used are Performance Management and Configuration Management as defined in 3GPP TS 32.401 v16.0.0, 3GPP TS 32.404 v16.0.0, or 3GPP TS 32.425 v16.5.0, respectively, and suitable for use for example in relation to network elements operating according to any wireless generation technology, such as 3G, 4G, and 5G. In the flow chart, a device 101 obtains information associated with at least one network device 103 according to step 201, calculates an average ISD, AVG_ISD, of the at least one network element and a number of the at least one network element's neighbors; assigns a tag to each network element according to step 202; determine a cluster for the network elements with the same tag, according to step 203. If a number of network elements in the cluster is lower than a first value, such as 30, the device 101 redetermines the cluster, according to step 208; if the number of network elements in the cluster is higher than a second value, such as 20, the device 101 discards the cluster according to step 209. Moreover, the device 101 aggregates performance data over a time interval, e.g. one week. Performance Management and Configuration Management are combined for a network element according to step 211. Then, Performance Management of the network elements of a cluster are aggregated according to step 211. Then, the device 101 determine a Performance Indicator value according to step 204. Next, the device 101 trains a machine learning model according to step 206 and applies the trained machine learning model according to step 212.

An example scenario in which the present invention may be practiced is in relation to a network monitoring system of a RAN. In the example scenario, a device 101 can train a prediction model for predicting RAN performance by using information associated with the network elements of the RAN. The trained prediction model can then be used to predict KPIs of the RAN, such as Mean Active Dedicated EPS Bearer Utilization or other suitable KPIs. The same device 101 or a further device can calculate the KPIs of the same RAN by using information associated with the network elements of the RAN obtained at a time period different from the time period the information used for the training were obtained. These two sets of KPIs, i.e. the predicted KPIs and the calculated KPIs, can be compared. If their values differ more than a certain threshold, a notification can be sent to a network system administrator that can take an action, such as adding new base stations to increase capacity.

A further example scenario is the prediction of KPIs to be use in the planning phase of a RAN. One of the most challenging issues during a RAN sales engagement is predicting to KPI targets such as session setup success rate, session setup abnormal release rate, handover success rate, etc. before the network has been deployed. These KPIs are used as a reflection of the quality of the newly deployed network. Thus, a prediction model trained by a device 101 can be used to predict KPIs of the RAN to be used for the planning phase.

Figure 6:
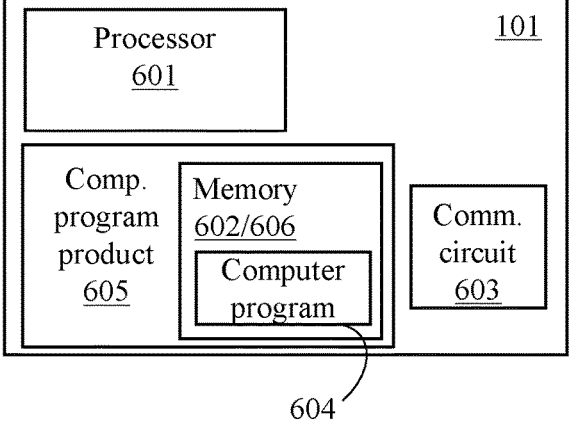
FIG. 6 is a block diagram depicting a device according to embodiments.

FIG. 6 is a block diagram illustrating an example of a device 101, comprising a processor 601, a computer program product 605 in the form of a computer readable storage medium 606 in the form of a memory 602 and communication circuitry 603. The memory 602 comprises instructions executable by the processor 601 whereby the communication device 101 is operative to perform a method as summarized above in relation to the device 101. The communication device 101 is adapted to receive a message from a device 102 and send a message to the device 102. The communication circuitry 603 of the device 101 is configured to send and/or receive messages in accordance with a predetermined protocol, such as MQTT, IP, TCP, HTTP, wherein the protocol can be an internal protocol if the device 101 and the device 102 are hosted on the same device.

The computer program product 605 comprises a computer program 604, which comprises computer program code loadable into the processor 601, wherein the computer program 604 comprises code adapted to cause the device 101 to perform one or more of the steps of the method and the embodiments described herein, when the computer program code is executed by the processor 601. In other words, the computer program 604 may be software hosted by the communication device 101.

Figure 7:
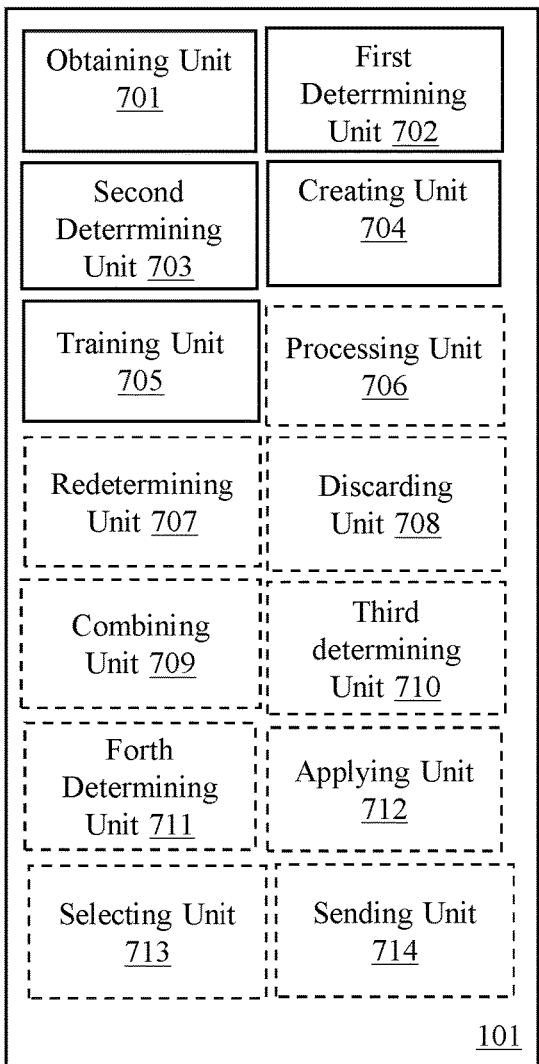
FIG. 7 is a block diagram depicting unit modules of a device according to embodiments.

FIG. 7 schematically illustrates, in terms of a number of functional units, the components of a device 101 according to an embodiment.

The device 101 comprises an obtaining unit 701 configured to obtain information associated with at least one network element; a first determining unit 702 configured to determine a tag for the at least one network element; a second determining unit 703 configured to determine, based on the tag, a cluster to be associated with the at least one network element; a creating unit 704 configured to create a training set: a training unit 705 configured to train a prediction model using the training set. Then the device 101 illustrated in FIG. 7 may optionally further comprise one or more of the following units: a processing unit 706 configured to process the performance data; a redetermining unit 707 configured to redetermine a cluster for the at least one network element; a discarding unit 708 configured to discard the cluster; a combining unit 709 configured to combine the performance data for the at least one network element with the configuration data of the at least one network element; a third determining unit 710 configured to determine a performance indicator value for the at least one cluster; a fourth determining unit 711 configured to determine a cluster performance data for the at least one cluster; an applying unit 712 configured to apply the prediction model; a selecting unit 713 configured to selecting an output of the prediction model, a sending unit 714 configured to send the prediction model to a device for prediction of Radio Access Network performance.

In general terms, each functional unit 701-714 may be implemented in hardware or in software. Preferably, one or more or all functional modules 701-714 may be implemented by using the processor 601, possibly in cooperation with the communications circuitry 603 and the computer readable storage medium 606 in the form of a memory 602. The processor 601 may thus be arranged to fetch instructions as provided by a functional module 701-714 from the computer readable storage medium in the form of a memory 602, and to execute these instructions, thereby perform any steps of the device 101 as disclosed herein. The processor 601 could be implemented in one or more processing units.

Figure 8:
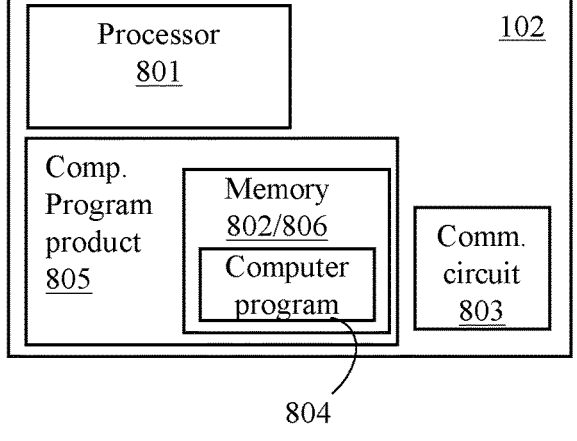
FIG. 8 is a block diagram depicting a device according to embodiments.

FIG. 8 is a block diagram illustrating an example of a device 102, comprising a processor 801, a computer program product 805 in the form of a computer readable storage 806 medium 806 in the form of a memory 802 and communication circuitry 803. The memory 802 comprises instructions executable by the processor 801 whereby the device 102 is operative to perform a method as summarized above in relation to the device 102. The device 102 is adapted to send a message to a communication device 101 and receive a message from the communication device 101. The communication circuitry 803 of the communication device 102 is configured to send and/or receive messages in accordance with a predetermined protocol, such as MQTT, IP, IP, TCP, HTTP, wherein the protocol can be an internal protocol if the device 102 and the device 101 are hosted on the same device.

The computer program product 805 comprises a computer program 804, which comprises computer program code loadable into the processor 801, wherein the computer program 804 comprises code adapted to cause the device 102 to perform one or more of the steps of the method and the embodiments described herein, when the computer program code is executed by the processor 801. In other words, the computer program 804 may be software hosted by the device 102.

Figure 9:
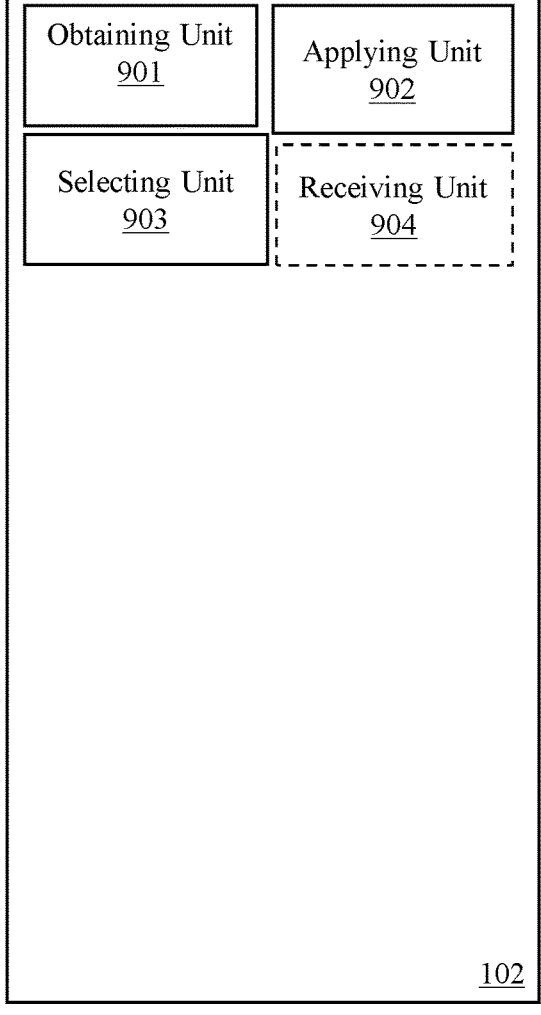
FIG. 9 is a block diagram depicting unit modules of a device according to embodiments.

FIG. 9 schematically illustrates, in terms of a number of functional units, the components of a device 102 according to an embodiment. The device 102 comprises an obtaining unit 901 configured to obtain information associated with at least one network element; an applying unit 902 configured to apply the prediction model to the obtained information; a selecting unit 903 configured to select an output of the prediction model. Then the device 102 illustrated in FIG. 9 may optionally further comprise a receiving unit 904 configured to receive a prediction model from a device for training a prediction model.

In general terms, each functional unit 901-904 may be implemented in hardware or in software. Preferably, one or more or all functional modules 901-904 may be implemented by using the processor 801, possibly in cooperation with the communications circuitry 803 and the computer readable storage medium in the form of a memory 802. The processor 801 may thus be arranged to, fetch instructions as provided by a functional module 901-910 from the computer readable storage medium in the form of a memory 802, and to execute these instructions, thereby perform any steps of the network device 102 as disclosed herein. The processor 801 could be implemented in one or more processing units.

The invention claimed is:

1. A device for training a prediction model for predicting Radio Access Network performance, the device comprising a processor and a memory, the memory having stored thereon instructions executable by the processor, the instructions, when executed by the processor, cause the processor of the device to:

obtain information associated with a plurality of network elements, at least part of the information relating to performance data of the network elements and part of the information relates to configuration data of the network elements;

determine a respective tag for the network elements of the plurality of network elements, a tag of a network element being based on a network environment property of the network element, the tag indicating a level of development of an area in which the network element is located, the level of development based on an average inter-site distance of network elements in the area;

determine, based on the tag, a cluster to be associated with the respective network elements, thus forming at least one cluster which has at least one network element associated thereto;

determine a performance indicator value of at least one of the at least one cluster based on the performance data of the at least one network element associated with the cluster;

create a training set comprising the performance indicator value of at least one of the at least one cluster and the configuration data of at least one network element associated with the at least one of the at least one cluster; and train, using the training set, a supervised machine learning model for prediction.

2. The device according to claim 1, wherein the instructions, when executed by the processor, cause the processor of the device to determine a cluster performance data for the at least one cluster, wherein the cluster performance data is based on the performance data of the at least one network element associated with the cluster, and determine the performance indicator value based on the cluster performance data.

3. The device according to claim 1, wherein at least a part of the information associated with the at least one network element relates to a location of the network element.

4. The device according to claim 1, wherein the instructions, when executed by the processor, cause the processor of the device to process the performance data for the at least one network element by aggregating performance data over a time interval.

5. The device according to claim 1, wherein the instructions, when executed by the processor, cause the processor of the device to combine the performance data for the at least one network element with the configuration data of the at least one network element.

6. The device according to claim 3, wherein the training set further comprises the cluster performance data.

7. The device according to claim 1, wherein the instructions, when executed by the processor, cause the processor of the device to determine the tag based on a value representing the distance between the at least one network element and one or more neighbors of the at least one network element.

8. The device according to claim 1, wherein the instructions, when executed by the processor, cause the processor of the device to determine the cluster based on geographical proximity between the network element and a further network element with a same tag.

9. The device according to claim 1, wherein the instructions, when executed by the processor, cause the processor of the device to associate a number of at least one further network element with the cluster, the number falling within a range of 10 to 50.

10. The device according to claim 9, wherein the number falls within the range of 20 to 30.

11. The device claim 1, wherein the instructions, when executed by the processor, cause the processor of the device to redetermine a cluster for the at least one network element of a cluster if the number of at least one network element of the cluster is higher than an upper bound value.

12. The device according to claim 1, wherein the instructions, when executed by the processor, cause the processor of the device to discard the cluster if the number of at least one further network element of the cluster is lower than a lower bound value.

13. The device according to claim 2, wherein the instructions, when executed by the processor, cause the processor of the device to determine the cluster performance data by aggregating the performance data aggregated over a time interval of a first network element with further performance data aggregated over a time interval of at least one further network element, wherein the at least one further network element is associated with the cluster.

14. The device according to claim 1 wherein the instructions, when executed by the processor, cause the processor of the device to:

apply the prediction model to information associated with at least one unseen cluster of network elements, wherein part of the information relates to performance data of the network elements associated with the unseen cluster, part of the information relates to configuration data of the network elements associated with the cluster, and part of the information relates to a tag representing a network environment property of the network elements associated with the cluster; and select an output of the prediction model as a performance indicator value for a prediction of Radio Access Network performance of the at least one unseen cluster of network elements.

15. The device according to claim 1, wherein the instructions, when executed by the processor, cause the processor of the device to obtain the information associated with at least one network element from the at least one network element.

16. The device according to claim 1 wherein the instructions, when executed by the processor, cause the processor of the device to:

send the prediction model to a device for prediction of Radio Access Network performance.

17. A computer-implemented method of training a prediction model performed by a device for training a prediction model for predicting Radio Access Network performance, the method comprising:

obtaining information associated with a plurality of network elements, at least part of the information relating to performance data of the network elements and part of the information relates to configuration data of the network elements;

determining a respective tag for the network elements of the plurality of network elements, a tag of a network element being based on a network environment property of the network element, the tag indicating a level of development of an area in which the network element is located, the level of development based on an average inter-site distance of network elements in the area;

determining, based on the tag, a cluster to be associated with the respective network elements, thus forming at least one cluster which has at least one network element associated thereto;

determining a performance indicator value of at least one of the at least one cluster based on the performance data of the at least one network element associated with the cluster;

creating a training set comprising the performance indicator value of at least one of the at least one cluster and the configuration data of at least one network element associated with the at least one of the at least one cluster; and training, using the training set, a supervised machine learning model for prediction.

18. A device for prediction of Radio Access Network performance, the device comprising a processor and a memory, the memory having stored thereon instructions executable by the processor, the instructions, when executed by the processor, cause the processor of the device to:

obtain information associated with at least one cluster of network elements, part of the information relating to a cluster of network elements relating to performance data of the network elements associated with the cluster, part of the information relating to configuration data of the network elements associated with the cluster, and part of the information relating to a tag representing a network environment property of the network elements associated with the cluster, the tag indicating a level of development of an area in which the network element is located, the level of development based on an average inter-site distance of network elements in the area;

apply to the obtained information, a prediction model for prediction of Radio Access Network Performance; and select an output of the prediction model as a performance indicator value for a prediction of Radio Access Network performance of the at least one cluster of network elements.

19. The device according to claim 18, wherein the instructions, when executed by the processor, cause the processor of the device to further receive a prediction model from a device for training a prediction model, wherein the prediction model has been prepared by the device for training a prediction model by using a training set comprising a performance indicator value based on training cluster performance data and training configuration data of at least one training network element associated with a training cluster.

20. A method of prediction of Radio Access Network performance performed by a device of prediction, the method comprising:

obtaining information associated with at least one cluster of network elements, part of the information relating to performance data, part of the information relating to configuration data, and part of the information relating to a tag representing a network environment property of the network elements, the tag indicating a level of development of an area in which the network element is located, the level of development based on an average inter-site distance of network elements in the area;

applying to the obtained information, a prediction model for prediction of Radio Access Network Performance; and selecting an output of the prediction model as a performance indicator value for a prediction of Radio Access Network performance of the at least one cluster of network elements.

* * * * *